(No Model.)

J. TAYLOR.
TRAY FOR HOLDING FRUIT CANS.

No. 253,898. Patented Feb. 21, 1882.

Witnesses:
Willie O. Stark.
M. Stark.

Inventor:
Job Taylor,
by Michael J. Stark,
Attorney.

N. PETERS, Photo-Lithographer, Washington, D. C.

UNITED STATES PATENT OFFICE.

JOB TAYLOR, OF EAST HAMBURG, NEW YORK.

TRAY FOR HOLDING FRUIT-CANS.

SPECIFICATION forming part of Letters Patent No. 253,898, dated February 21, 1882.

Application filed November 9, 1881. (No model.)

*To all whom it may concern:*

Be it known that I, JOB TAYLOR, of East Hamburg, in the county of Erie and State of New York, have invented certain new and useful Improvements on a Tray for Holding Fruit-Cans; and I do hereby declare that the following description of my said invention, taken in connection with the accompanying sheet of drawings, forms a full, clear, and exact specification, which will enable others skilled in the art to which it appertains to make and use the same.

This invention has general reference to a device for receiving fruit-cans for siruping; and it consists essentially in the peculiar combination of parts and details of construction, as hereinafter first fully set forth and described, and then pointed out in the claims.

Figure 1:
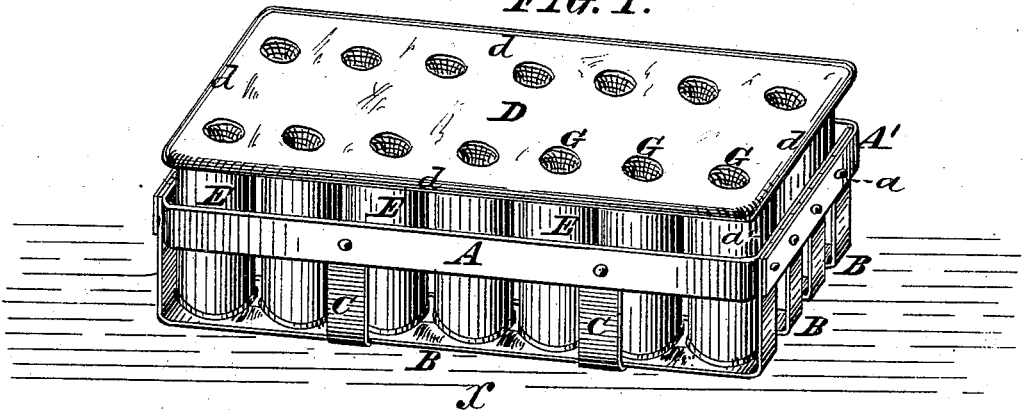
Figure 2:
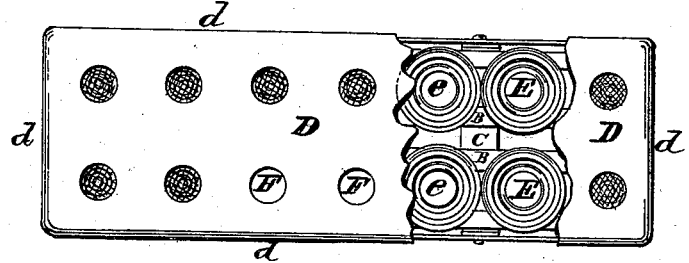
Figure 3:
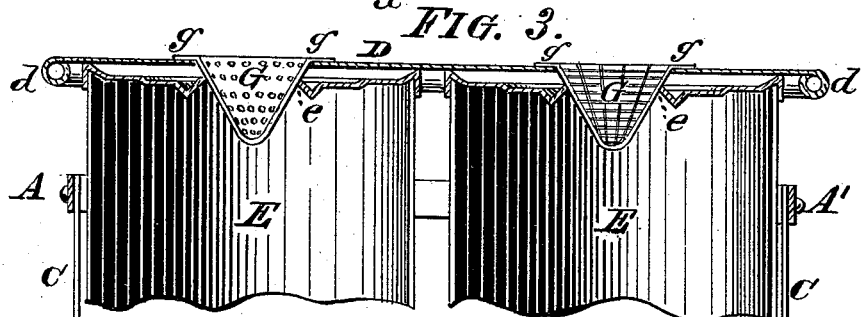
Figures 4, 5:
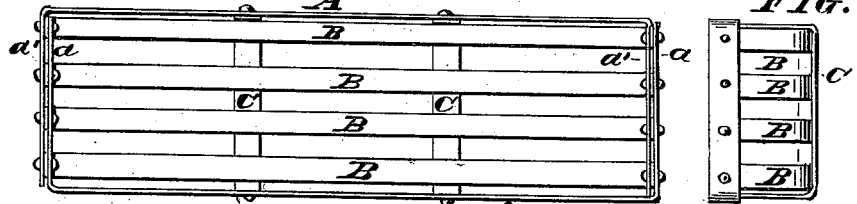

In the drawings already mentioned, which serve to illustrate my said invention more fully, Figure 1 is a perspective view of a basket or grate filled with cans and ready for immersion into the sirup bath. Fig. 2 is a plan of the same. Fig. 3 is a sectional elevation in line $x$ $x$ of Fig. 2. Fig. 4 is a plan of the tray or basket. Fig. 5 is an end view of the same.

Like parts are designated by corresponding letters of reference in all the figures.

The object of my present invention is the production of a device for holding fruit-cans while being immersed into the sirup bath, and at the same time to prevent their floating in the sirup, and also to prevent the fruit in said cans from rising and overflowing.

Fruit-cans while being dipped into the sirup are usually placed upon a tray or basket in one or more rows of a certain number each. My present tray consists of two U-shaped straps, A A', respectively, placed with their parallel members $a$ $a'$ together, so as to form a rectangular frame or band. To this band I rivet U-shaped bars B, and at right angles therewith U-shaped cross-bars C, the ends of the bars B being placed between the members $a$ $a'$ of the bands A A', and held together by means of rivets, as clearly shown in the drawings. Upon this tray I place the cans E, and retain them in position upon said tray by means of a plate, D, placed on the top of said cans. This plate D, I provide with a number of circular apertures, F, Fig. 2, corresponding with the number and size of cans upon the tray. These apertures I furnish with conical thimbles G, made from either perforated sheet metal or wire-cloth, said cones being fixed in said apertures in any suitable manner.

I prefer to make the plate D of sheet metal and to wire its edges $d$, or in any other manner construct the same so that its edges are sloped, to allow the sirup to readily drain or run from said plate. I furthermore prefer to make the plate D so heavy that it, when placed upon the cans, will prevent them from floating in the sirup. I do, however, not wish to confine myself to the use of the said plate for holding down the cans, since I may use separate means for locking the cans to the tray, and thereby prevent them from floating.

It will now be readily observed that by constructing the plate D in the manner described I derive various advantages over other methods of preparing fruit-cans for the bath—viz., by fixing a number of the cones to the plate D, I can provide all the cans with said cones at once, thereby saving considerable time, which is an essential element in fruit-canning. The plate will prevent the cans from floating in the bath, thereby dispensing with means or devices for clamping the cans to the tray, which must be applied to and removed from the tray—an operation which again consumes time.

I am aware that the placing of a perforated or wire-cloth basket or strainer into the cans, to prevent their contents from rising and overflowing said cans while being dipped, is not new. I do not therefore claim such a device or devices as my invention; but,

Having thus fully described my said invention, I claim as new and desire to secure to me by Letters Patent of the United States—

1. As a new and improved article of manufacture, a dipping-tray for fruit-cans, consisting of a metallic basket composed of two U-shaped bands, A A', two (or more) longitudinal U-shaped slats, B, secured with their ends between the parallel members $a$ $a'$ of said bands A A', and the U-shaped transverse slats C, and a plate, D, having cone-shaped perforated protuberances G, the whole being constructed and combined substantially in the manner as and for the object stated.

2. The combination, with the tray A, of the cans E and the plate D, said plate being provided with a series of perforated protuberances, G, corresponding in position with the position of the filling-apertures $e$ in said cans E, substantially as and for the use and purpose stated.

3. A tray for holding fruit-cans, consisting of two U-shaped bands, A A', placed together as specified, the longitudinal U-shaped slats B, secured with their ends between the parallel members $a$ $a'$ of said bands A A', and the U-shaped transverse slats C, substantially as and for the object stated.

4. The combination, with the plate D, having a series of apertures, of the cone-shaped baskets G, having the flange $g$, as specified, said cone-shaped baskets being permanently affixed to said plate, substantially in the manner as and for the purpose indicated.

In testimony that I claim the foregoing as my invention I have hereto set my hand in the presence of two subscribing witnesses.

JOB TAYLOR.

Attest:
MICHAEL J. STARK,
JOHN C. DUERR.